(12) United States Patent
Macneille et al.

(10) Patent No.: US 10,117,062 B2
(45) Date of Patent: Oct. 30, 2018

(54) METHOD AND APPARATUS FOR VEHICULAR DEVICE-FUNCTION CONTROL

(71) Applicant: FORD GLOBAL TECHNOLOGIES, LLC, Dearborn, MI (US)

(72) Inventors: Perry Robinson Macneille, Lathrup Village, MI (US); Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/437,225

(22) Filed: Feb. 20, 2017

(65) Prior Publication Data

US 2018/0242113 A1  Aug. 23, 2018

(51) Int. Cl.
| | |
|---|---|
| *H04W 4/02* | (2018.01) |
| *H04W 4/029* | (2018.01) |
| *H04W 48/04* | (2009.01) |
| *G01S 5/02* | (2010.01) |

(52) U.S. Cl.
CPC ......... *H04W 4/029* (2018.02); *G01S 5/0252* (2013.01); *G01S 5/0273* (2013.01); *H04W 48/04* (2013.01)

(58) Field of Classification Search
CPC ..... H04W 4/028; H04W 48/04; G01S 5/0252; G01S 5/0273
See application file for complete search history.

(56) References Cited

U.S. PATENT DOCUMENTS

| | | | | |
|---|---|---|---|---|
| 9,042,872 B1* | 5/2015 | Breed | .............. | H04M 1/72577 455/414.1 |
| 9,813,878 B1* | 11/2017 | Buttolo | ................... | H04L 67/22 |
| 9,846,912 B1* | 12/2017 | Slusar | .................... | G06Q 40/08 |
| 2010/0062793 A1* | 3/2010 | Sun | ........................ | G01S 5/0284 455/456.3 |
| 2010/0309051 A1* | 12/2010 | Moshfeghi | ............ | H04W 4/029 342/378 |
| 2013/0314269 A1* | 11/2013 | Jansseune | ............... | G01S 11/08 342/44 |
| 2014/0206389 A1* | 7/2014 | Aldana | ................. | H04W 4/021 455/456.2 |
| 2015/0149018 A1* | 5/2015 | Attard | .................. | G05D 1/0061 701/23 |
| 2015/0149042 A1* | 5/2015 | Cooper | ................. | B60R 16/037 701/48 |
| 2015/0288804 A1* | 10/2015 | Kadous | ............ | H04M 1/72577 455/418 |

(Continued)

FOREIGN PATENT DOCUMENTS

EP          3073284 A1     9/2016

*Primary Examiner* — Mehmood B. Khan
(74) *Attorney, Agent, or Firm* — Jennifer Stec; Brooks Kushman P.C.

(57) ABSTRACT

A system includes a processor configured to transmit a series of impulses into a vehicle interior. The processor is also configured to receive data from a wearable-device receiver receiving the impulses, the data indicating arrival times and magnitudes of the impulses. The processor is further configured to analyze the arrival times and magnitudes to determine a likely wearable device location and control a functionality aspect of a mobile device associated with the wearable device, based on the likely wearable device location.

18 Claims, 8 Drawing Sheets

(56) References Cited

U.S. PATENT DOCUMENTS

| | | | |
|---|---|---|---|
| 2015/0365714 A1* | 12/2015 | Gildfind | H04N 21/44218 |
| | | | 725/12 |
| 2016/0249165 A1* | 8/2016 | Aldana | H04W 4/023 |
| 2016/0253895 A1* | 9/2016 | Prakah-Asante | ........................... |
| | | | G08B 21/0453 |
| | | | 340/539.12 |
| 2016/0259033 A1* | 9/2016 | Vladimirov | G01S 3/50 |
| 2017/0019525 A1* | 1/2017 | Hannon | H04M 1/72577 |
| 2017/0041816 A1* | 2/2017 | Cho | G06K 9/00838 |
| 2017/0064516 A1* | 3/2017 | Buttolo | H04W 4/046 |
| 2017/0177723 A1* | 6/2017 | Price | H04W 4/04 |
| 2017/0347238 A1* | 11/2017 | Menouar | H04W 4/027 |
| 2018/0050661 A1* | 2/2018 | Shim | B60K 35/00 |

* cited by examiner

US 10,117,062 B2

METHOD AND APPARATUS FOR VEHICULAR DEVICE-FUNCTION CONTROL

TECHNICAL FIELD

The illustrative embodiments generally relate to methods and apparatuses for vehicular device-function control.

BACKGROUND

Connected vehicles present an opportunity for a driver or occupant to access and utilize remote functionality, such as email, text messaging, the Internet, etc., on a near-constant basis while a vehicle is traveling. Since this access can create a potential distraction to a driver, one course of action vehicle manufacturers take to minimize distraction is to disable a good deal of vehicular interactive functionality while a vehicle is in motion or traveling over a certain speed. This is a reasonable solution, but it can be frustrating to users when other occupants are present, who could control the functionality without incurring distraction to a driver.

Also, in many instances, drivers and other occupants possess wireless devices, such as cellular phones, which allow similar connectivity. This setup can help resolve any connectivity issues by providing some degree of connectivity and remote system access when multiple users are present. A problem can occur, however, when only a single occupant (the driver) is present. Since a manufacturer may have the vehicle configured to disable the vehicular connectivity or interaction functionality, the driver may be tempted to use a wireless device as a source of connectivity while driving.

Use of cellular devices to text, surf the Internet or otherwise engage in input/reading activity while driving can be a distracting undertaking. If a driver is focused on interaction with a cellular device, the driver is not focused on interaction with the driving environment. One option would be to block or disable all connectivity to devices while they are in a vehicle enclosure, but this would unduly limit access by people who are not driving. It is also possible to disable specified devices while the device is in a vehicle, but any given device may be possessed by a person who is a driver in one instance and a non-driver in another instance. In such a case, if the device was pre-specified for disablement (based on a device identifier, for example), the person may be dissatisfied when attempting to use the device as a passenger, because the device would still then be disabled, since the identifier would remain the same.

SUMMARY

In a first illustrative embodiment, a system includes a processor configured to transmit a series of impulses into a vehicle interior. The processor is also configured to receive data from a wearable-device receiver receiving the impulses, the data indicating arrival times and magnitudes of the impulses. The processor is further configured to analyze the arrival times and magnitudes to determine a likely wearable device location and control a functionality aspect of a mobile device associated with the wearable device, based on the likely wearable device location.

In a second illustrative embodiment, a computer-implemented method includes controlling functionality of a cellular phone based on user-location identification resulting from analysis of observed relative timing and strength values of signals received by a wearable device, the device having a predefined association to the cellular phone, the signals including a plurality of received signals for each of a series of impulses transmitted by a vehicle transceiver included in a vehicle also containing both the wearable device and cellular phone.

In a third illustrative embodiment, a non-transitory storage medium stores instructions that, when executed by a processor, cause the processor to perform a method including transmitting a series of impulses from a vehicle transceiver. The method also includes analyzing arrival data, including relative strength and timing, of a plurality of received signals for each of the series of impulses, received by and reported from a wearable device, to determine a wearable device location. The method further includes determining a user location based on the wearable device location, the user having a predefined association with the wearable device and controlling mobile device functionality, the mobile device having a predefined association with the wearable device or user, the control based on mobile device location.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
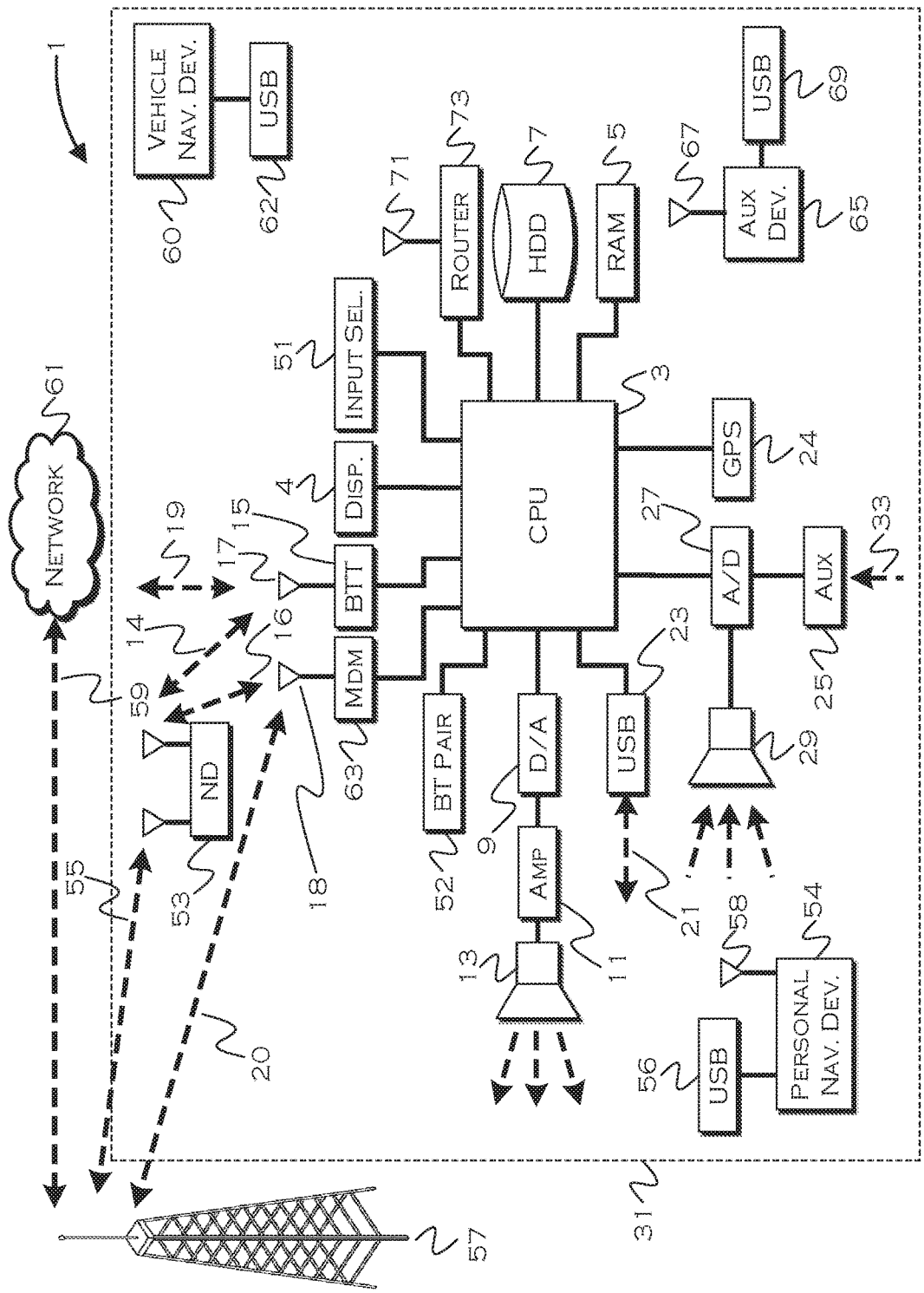
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative embodiments, a vehicle computing system controls mobile device access based on a user-location within a vehicle. While it has been previously contemplated to control access based on device location, such a solution may be defeatable by a determined user, who can simply hold or place the device in a "zone" that is not designated as a "driver" zone, thereby enabling the device (because the vehicle detects the device in a non-driver location). Such detection methods may be more appropriate if supplemented by, or even replaced by, the illustrative embodiments. Various aspects of device functionality can be controlled responsive to zone detection, such as, but not limited to, calling or texting ability, vehicular control ability, media control ability, etc.

To determine a user location in a vehicle, the illustrative embodiments detect the location of a user wearable device. Since these devices are typically worn (and thus not easily set aside or moved from the same location as the user), the detection process can make a determination that a device location corresponds to a user location with a higher degree of confidence.

The system also includes device profiles for the mobile devices which the system will control. These profiles include a correlation between a wearable device and the mobile device, such that the system associates the mobile device with the wearable device to effectively determine the location of the mobile device through detection of the location of the mobile device user based on the wearable.

Figure 2:
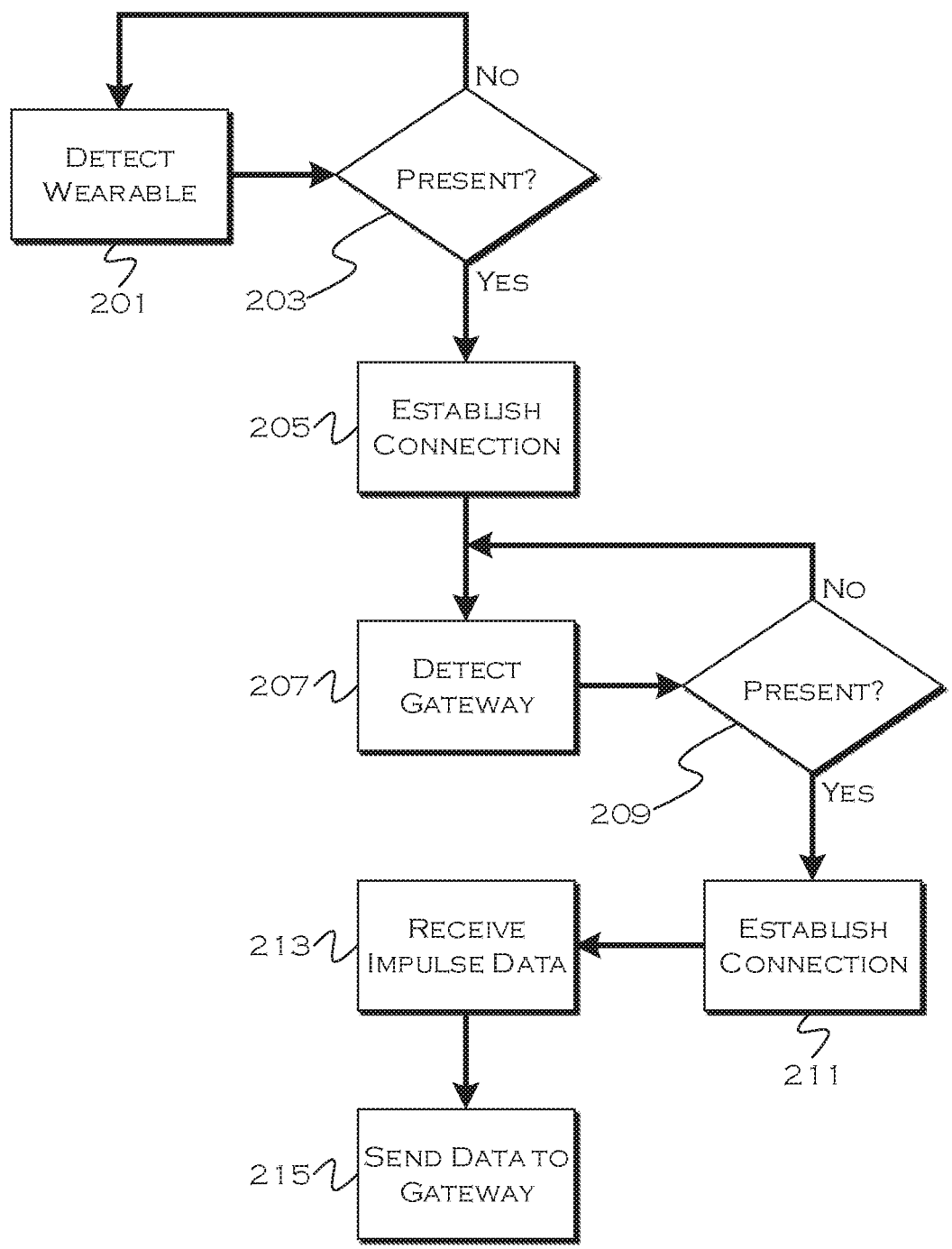
FIG. 2 illustrates a non-limiting example of a mobile device process for signal reporting.

FIG. 2 illustrates a non-limiting example of a mobile device process for signal reporting. An application running on the mobile device executes this process to establish sufficient initial connectivity to report detected vehicle signals, which in turn enables mobile device control via the vehicle.

In this illustrative example, the mobile device is paired with or otherwise connected to a wearable device. Since the wearable device is used as the basis to determine the user (and thus the mobile device) location, the mobile device first attempts to ensure that the wearable device is present 201.

There are many instances where a user will simply want to ignore or opt out of this control paradigm, especially if mobile device usage while driving is not limited by law. When legal concerns dictate device usage, however, or if parents wish to control young adult device usage while the young adult is driving, the illustrative embodiments can provide a useful model for controlling device usage in a manner that more carefully restrict only the usage of a driver's device.

For example, a parent may install an application on a child mobile device that will completely prevent device usage while the device is under speed (traveling over a certain speed), unless a vehicle grants access permission to the device. In another model, the application on the mobile device may grant the access while the device is under speed, as long as at least the wearable is present, and in this case the parent relies on the vehicle to restrict access if the device-possessor is also the driver. The restrictive portion of the second model at least ensures that the user must be wearing or otherwise possessing the wearable, which provides at least some level of assurance that vehicular controls can be engaged. Of course, any of these methods can be defeated by a determined user, but at least the illustrative embodiments provide an alternative to mere device location detection alone, the alternative being more likely to result in successful control over a driver's device because of the typically non-transient nature of a wearable device vs. a mobile phone.

In this example, if the mobile device detects the presence 203 of the wearable, the mobile device process will proceed with the remainder of the signal reporting process. While in this example, the mobile device process merely loops to continue detection attempts, in other examples the process could disable the mobile device (or a subset of device functions), if the process did not detect the wearable and the mobile device began to move over a certain speed (e.g., a speed unachievable by non-motorized transportation).

If the mobile device process detects the wearable device, the mobile device process can establish a connection 205 with the wearable device. Also, in this example, the system includes a gateway to the vehicle bus. In this example, once the process detects the wearable device, the process will begin to search for the presence of the vehicle gateway 207. When the mobile device user is sufficiently close to (or in some cases, within) a vehicle, the process detects the gateway as being present 209 and also establishes a connection with the gateway 211.

Once the process establishes a connection with both the gateway and the wearable device, the process can begin to report signal data back to the vehicle for device location detection. In this example, the vehicle sends out intermittent signals that the wearable device detects. In this example, the wearable device, which includes a receiver that receives the signals from the vehicle. The wearable device then transmits the signals to the mobile device 213, which transmits the signals back to the gateway 215. In another model, the wearable device may transmit signal data to the vehicle gateway directly. In either example, the gateway can use the data to determine the wearable device location and control the mobile device functionality based on the wearable device location.

Figure 3:
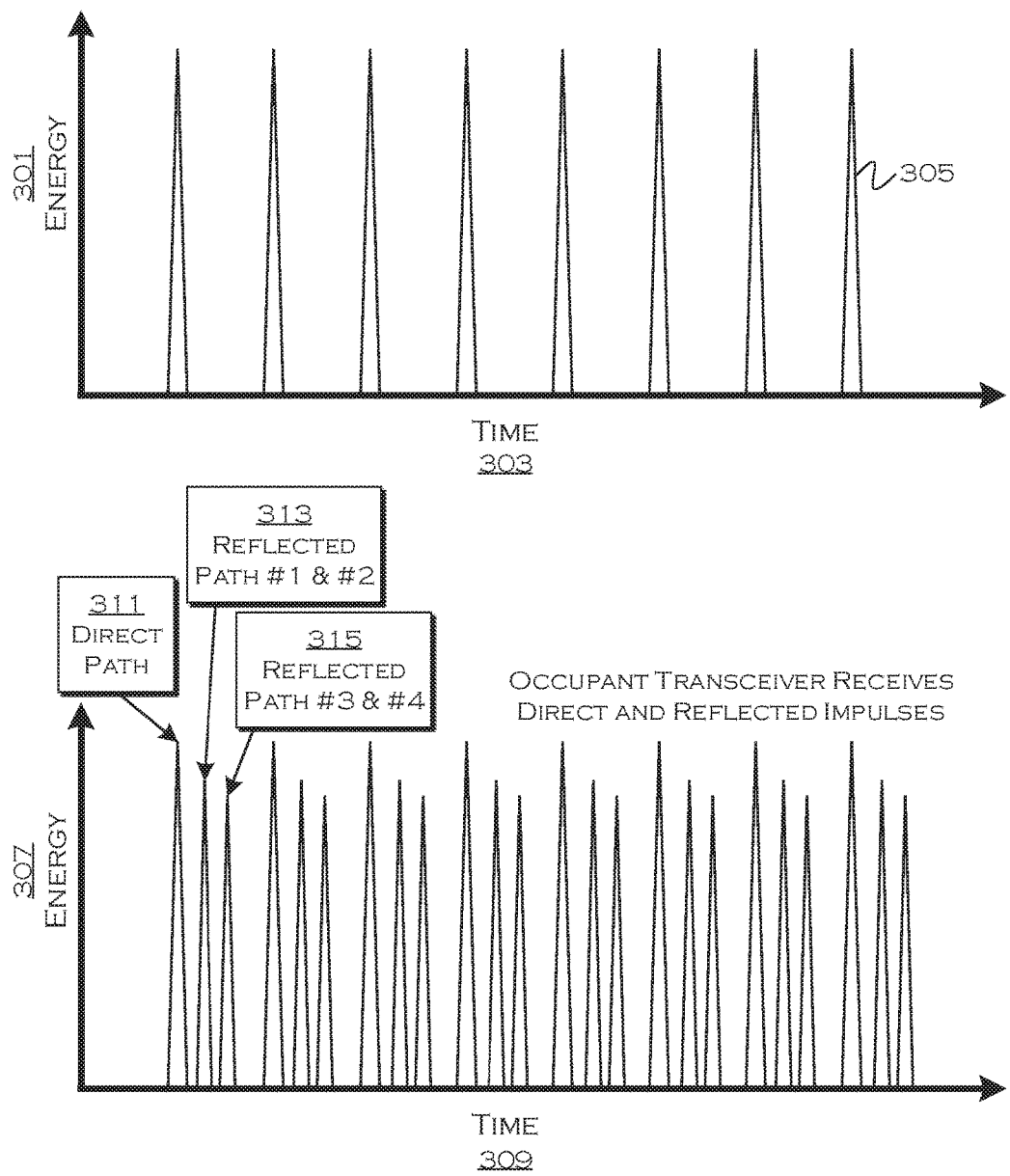
FIG. 3 illustrates a non-limiting example of a signal output and a signal detection profile.
Figure 4:
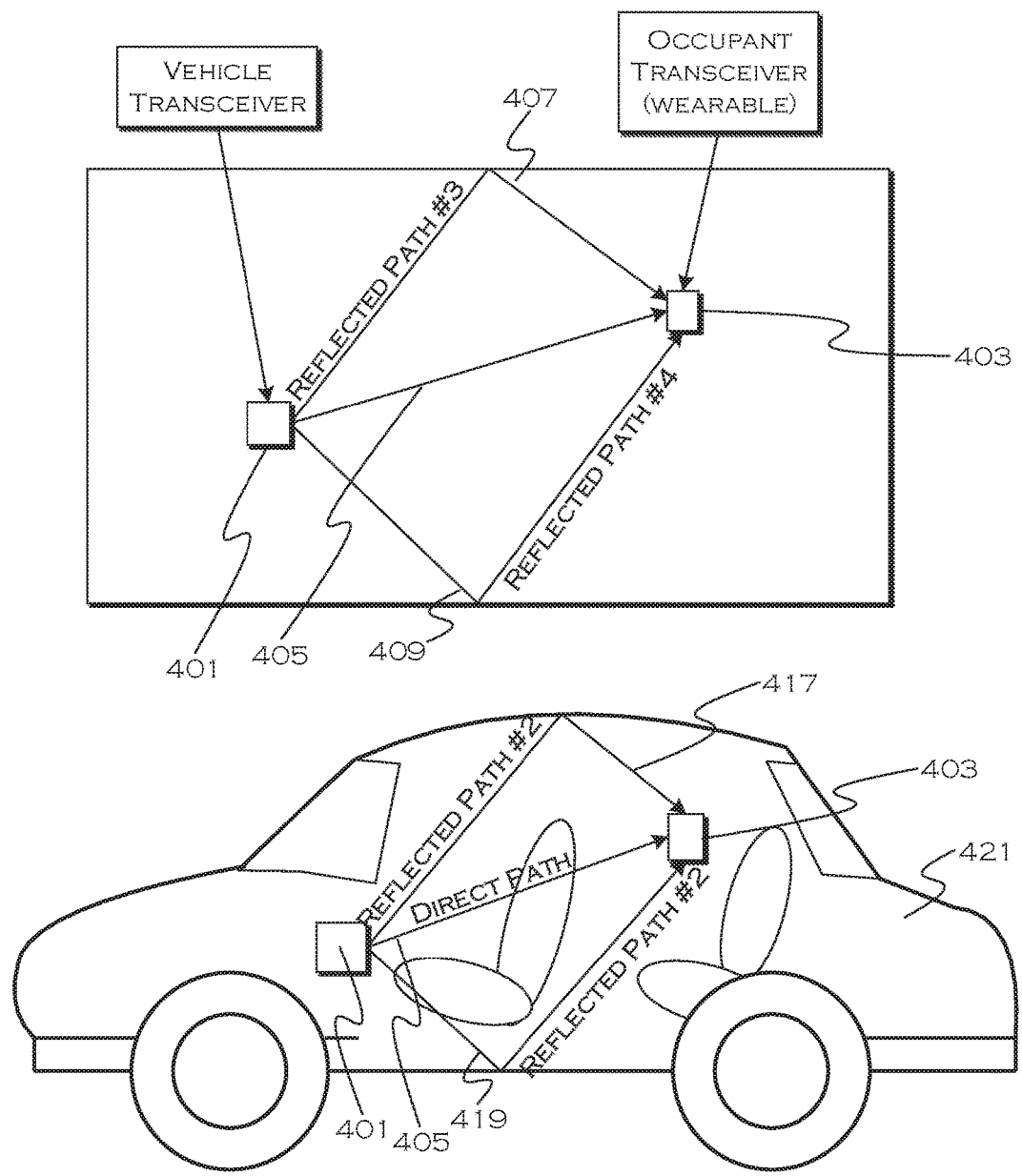
FIG. 4 illustrates a non-limiting example of a device detecting an output signal.

FIGS. 3 and 4 illustrate a non-limiting example of a signal output and a signal detection profile. The first graph shows signals 305 of consistent energy 301. The signals are sent out at predetermined intervals 303, which effectively produces a consistent signal pulse. Since the signals are sent at consistent power levels and over known intervals, the vehicle can use the data reported back from the device to determine with what frequency these signals are received. The wearable device may receive each signal more than once, as can be seen from the second graph in FIG. 3. The signals may be sent from a transmitter that sends signals throughout the entire cabin, although discretely focused signals are also possible.

In the second graph of FIG. 3, the various timing and strength of signals received at the wearable device is shown. In this example, the signal 311 received over the direct path 405 is both the strongest signal and is received first. This represents the least signal degradation and fastest receipt. A second signal indicator 313 indicates that the same signal was received at a second time, which may be the signal being reflected over a path off of a vehicle 421 cabin interior ceiling or a cabin interior floor. An illustrative example of these paths can be seen in FIG. 4, showing both a top-down view and a side-view of a vehicle space. Similar methodologies could be used in other closed spaces.

Paths 407 and 409 represent signals being bounced off of vehicle cabin interior sidewalls. A third signal 315 indicates the wearable device 403 receiving another reflected signal, such as one reflected off of a left-hand or right-hand sides of the cabin interior. The side-view of the vehicle in FIG. 4 shows illustrative signal reflection paths 417 and 419, representing signals reflected off of the top and bottom of a cabin interior, respectively. The direct path 405 is essentially an axis about which the views rotate.

In this example, the transceiver may be located in a relatively centralized location in the center stack of the vehicle. Wherever the transmitting 401 transceiver that provides the signals is located, it is not always the case that the wearable device receives signals over paths 407 and 409 and paths 417 and 419 at the same time.

Figure 5:
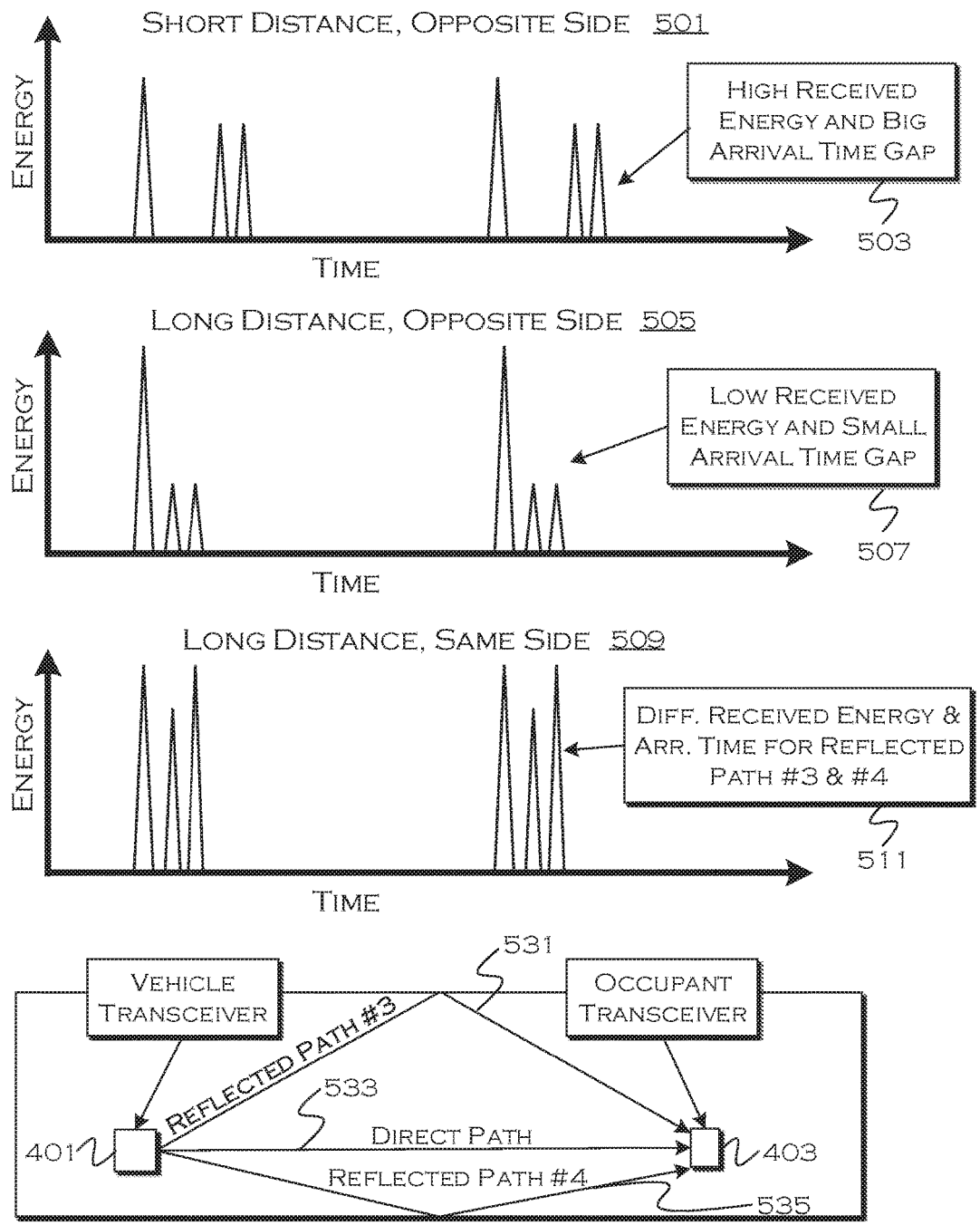
FIG. 5 illustrates a non-limiting example of varied detection profiles indicating varied device location.

FIG. 5 illustrates a non-limiting example of varied detection profiles indicating varied device location. If the transceiver that transmits the signals for detection is located on either side of a vehicle interior (left or right), varied signal receipt times and energy of received signals indicates the relative positioning of the wearable device, relative to the transceiver. For example, graph 501 indicates that the wearable device is located a short distance (front row of seats) and on an opposite side from the transceiver. In this figure, the high energy signal is still the direct path signal, as it has arrived most quickly over the most direct path. The large time gap between the receipt of the higher strength signal and the lower strength signals indicates the relative close proximity of the wearable to the transceiver, which has the effect of increasing the relative time gap between when the first (direct) signal is received and when reflected signals are received.

Graph 505 has a relatively small time gap between the reflected (lower strength) signals and the direct (higher strength) signal. This is because the relative distance the direct signal and reflected signal travels is a more approximately similar ratio when the wearable device is a longer distance away from the vehicle transceiver. That is, when the wearable and vehicle transceivers are relatively close, the direct path is very short but the reflected path may still be long relative to the direct path (creating the time gap). When the wearable and vehicle transceivers are relatively distant, the ratio between the direct path and reflected path is closer to 1 (causing less of a gap between when the signals are received. The relative strength of the signals can help determine whether a signal traveled a longer or shorter distance before reaching the wearable transceiver, and using this information the gateway can determine a location of the device within the vehicle relative to the transceiver, which is at a known, fixed position. Graph 509 shows the case where signals are received with relatively high energy (to each other) and with relatively small arrival time gaps. In graph 509, the second and third signals of each triplet are received with different timing and energy due to the fact that the signals have varied travel times, as can be seen from the top-down view of the vehicle shown in FIG. 5.

For simplicity's sake, if the vehicle is assumed to represent a 2×2 grid, with element 1,1 being the driver square, element 1,2 being the front passenger square, element 2,1 being the rear driver-side passenger and element 2,2 being the other rear passenger, the following signal values will indicate a relative position of a wearable device with respect to a vehicle transceiver positioned directly in front of the driver.

1,1: Low relative energy (for at least one signal) and high relative time gap between the first and second signals. The low relative energy is because at least one signal has to travel all the way to the opposite vehicle side and back as opposed to other reflected signals (traveling a short reflected path) and the direct signal traveling a very short path.

1,2: High relative energy (between at least the first and second signals) and high relative time gap between the first and second signals.

2,1: High relative energy (each signal has relatively similar amounts of energy) and low relative time gap between the first and second signals.

2,2: Low relative energy (each signal has relatively similar amounts of energy) and high relative time gap between the first and second signals.

The relativity of the time gap may be measured in a stock model of a particular vehicle for various locations, and gaps over a certain threshold may indicate certain relative locations within a vehicle. Since the cabin itself is a fixed object, as is the vehicle transceiver location, baseline data can be established for a given make and model and used to establish thresholds for that particular make and model. While passengers and objects within the cabin, as well as moved seating positions, may cause some deviances, the granularity of an applied grid can be adjusted to accommodate expected deviances. That is, if the grid (representing relative device locations) is not too fine, then expected arrival time variations for a given grid location should still represent some location within a grid square, albeit not necessarily the exact precise location where a baseline reading was taken.

In the example given of a 2×2 grid, a value measured at the center of each grid should indicate an approximate arrival time expected gap, and in practice when time gaps are approximately the same as the expected gap, then the device is likely located within a grid square corresponding to the expected time gap.

In at least one illustrative example, various vehicle cabins are mapped out and a lookup table is developed indicating expected signal values and timing within a vehicle model. Since there will likely be some interference present in a vehicle-in-use, tolerances can indicate which values within a range likely indicate which voxels in the vehicle space. The more granular the voxel array, the more precise the signal identifiers may need to be. False-positive correction (user assisted or automated) can help refine the values for general knowledge improvement and a particular user environment. The detected device will also likely often move around, so a detection in 3 adjacent voxels and one remote voxel probably indicates an error in the device being detected in the remote voxel (i.e., the lookup may have failed for that voxel). Depending on the frequency of signaling, device movement can also be tracked through space to better determine where a device (and device user) is likely located (e.g., a device being passed from one user to another, as opposed to a device moving from pocket to hand to ear).

In more generalized terms, a large gap between the first and second signals, relative to the gap between the second and third signals (being reflected signals) indicates that the wearable device is located closer to the transceiver (front row) and a relative energy of second and/or third received signals (reflected) being above a threshold ratio to the first received signal (direct) indicates that the device is likely on the same side of a vehicle as the transceiver.

Figure 6:
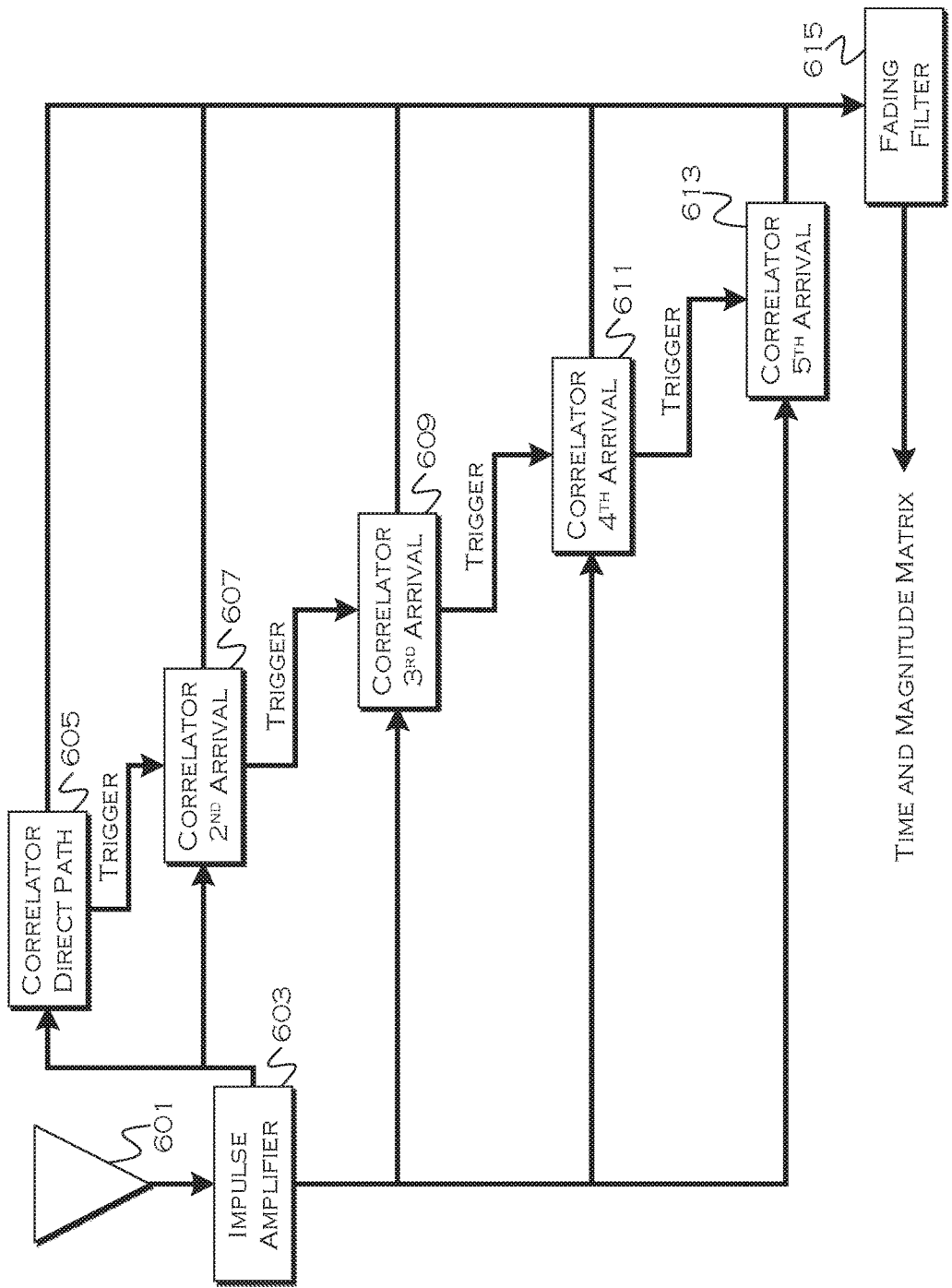
FIG. 6 illustrates a non-limiting example of a signal output and arrival pattern.

FIG. 6 illustrates a non-limiting example of a signal output and arrival pattern. In FIG. 6 time delay analysis is performed using correlators. The receiver receives the same series of impulses in a repeating pattern. The impulses are correlated against a parallel set of notch correlator devices that track a particular peak stating with the first arrival on to the final arrival. The impulse delays are stored as a time and magnitude matrix in a fading filter (615) that allows the timing to change and magnitude to change over many first arrivals to reduce noise but to allow for movement of the receiving device.

Periodically the time and magnitude matrix is correlated with the time and magnitude matrix for each voxel, and the voxel with highest correlation is selected as the location of the receiver.

In this illustrative example, the interval between impulses transmitted by the vehicle is known beforehand by the wearable device, which contains the transceiver 601. Impulses reflect off of a variety of surfaces in the vehicle, and pass through a variety of less reflective surfaces in the vehicle, and thus may be received in many varying states (in terms of when the impulses are received and how strong the impulses are). To some extent, this pattern of received impulses changes whenever a new impulse is received, although certain objects, such as the cabin walls and fixed vehicle members, remain fixed and constrain the reflection of impulses to some extent.

Figure 7:
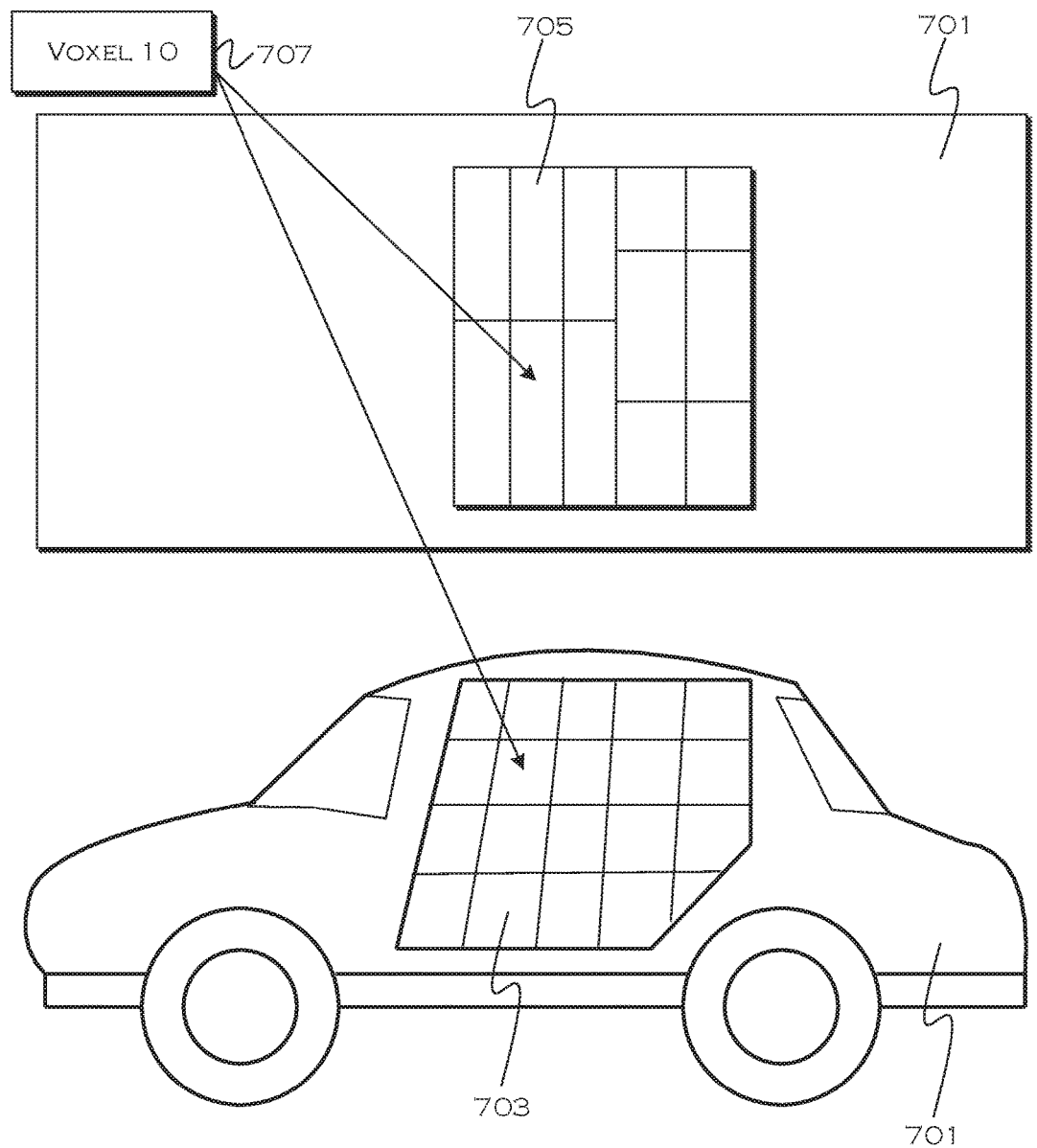
FIG. 7 illustrates a non-limiting example of a vehicle space divided into a coordinate system.

Using known data about the fixed constraints, as well as basing interpretation on observations made after the first, direct impulse is received 605, an analyzation process can determine an approximate relative position of the wearable device. The vehicle is generally divided into voxels as shown in FIG. 7. By dividing the vehicle into a three dimensional array, the analyzation process can determine the approximate location of the wearable device within the array. Even if this location is only a guess based on observed signal characteristics, the guess can generally determine whether the device is possessed by a passenger in a particular seating location.

The direct signal will arrive first, generally having no reflected path to the wearable device. It is possible that devices in the rear seating position, for example, may receive a reflected signal before receiving a direct signal, if the direct signal is impeded by significant barriers between the vehicle transceiver and the wearable device. In this case, the first arriving signal will be treated as the direct signal. Since most voxels representing each seating location represent a significant distance (in terms of voxels) between other seating locations, data gatherable from observing relative arrival times and magnitudes of subsequently arriving signals 607, 609, 611, 613 will provide sufficient information to determine a relative device location.

For example, if a vehicle has four discrete seating locations, and the vehicle transceiver is located in front of a driver, then it can be expected that a wearable worn by the driver will receive a signal within a very short time period from when the signaling begins. Since the distance to the wearable worn by the driver is typically less than half the distance to almost every other voxel in the other seating positions, a first-signal detection time below a certain threshold almost certainly indicates that the device is worn by a driver. Only if the driver was covering the wearable with significant shielding, or was reaching into another seating location, would no signals be detected within the threshold time.

If the sampling occurred in random intervals throughout a drive, or a portion of the drive, the reach-case should be quickly observed and accommodated.

Occupants in the front passenger seat and driver-side rear seat may have an approximate same-distance from the vehicle transceiver for many voxels designated as corresponding to one of those locations. But, in this instance, if the transceiver were directly in front of the driver, then only a signal passing directly through a driver seat would have a "direct" path to many of the driver-side rear seat locations. Conversely, most locations within the front passenger side seat will have an unimpeded path between the locations and the transceiver. Accordingly, it can be expected that a first signal arriving at a certain threshold magnitude and below a second threshold time, probably represents a signal received by the front passenger seat location (as opposed to the rear driver-side location), whereas a signal received at a time above the second threshold (having been reflected) or below the threshold magnitude, having been reflected and/or passing through impeding objects, such as a seat portion, will probably correspond to a rear driver-side seat.

At the same time, a wearable worn on the left wrist of a person sitting in the passenger-side rear seat may have a direct path to the transceiver (between the seats) and may actually receive a direct signal quickly, since there is no reflection or impedance between the vehicle transceiver and the wearable device. It is quite possible that this arrival time and signal magnitude would be almost the exact same as that for a device worn on the right wrist of a person in the front passenger seat.

As such, if only one signal were detected and analyzed, there may be significant confusion because of the relative values observable at various voxels in completely different seating locations being the same. By analyzing the relative time delay when further signals (reflected and/or impeded) signals are received, relative to the first signal and/or relative to each other, and by considering the relative magnitudes of the signals, it can be determined in which voxel the wearable device lies.

In the preceding example, secondary signals arriving at the wearable in the rear passenger seat may take significantly longer to arrive and may arrive with significantly less magnitude, having been reflected over greater distances to arrive at the rear seat location, then those detected at the front passenger seat. Or, at least, a second signal (reflected off of the front passenger door, for example) will arrive at the front passenger seat voxel before a second signal (reflected off of the roof or either side panel/door) will arrive at the rear passenger side seat voxel.

In a fixed environment where nothing ever changed, the characteristics of each voxel with respect to arrival times could be mapped out relatively precisely, with a high degree of granularity (many voxels). Since there are constant moving variables (seat locations, passengers, cargo, etc) within an active vehicle, less granularity in the voxel definitions may be utilized. Because the general intent may be to map a device to an approximate relative seating location that effectively reduces to a 2×2, 2×3, 2×2×3, 2×3×3, etc, top-down grid (representing various seating layouts), a voxel array with a relatively low degree of granularity may not present too many problems. As such, it is possible to utilize a very small cubic array to represent a broad guess version of the concept, whereas a finer set of voxels may provide additionally useful information, especially with regards to cases where seating locations brush up against each other.

People come in all shapes and sizes, and people rarely sit stationary in a vehicle. Accordingly, a device worn on the right wrist of six different people may commonly find itself in six entirely different locations, even if those six people were seated in the same seat in six otherwise identical vehicles. By having at least some degree of granularity to the voxel array, edge cases can be analyzed and a guess can be made about which location actually contains the person, when an analyzation process detects a wearable in a plurality of voxels, some of which each correlate to different seating locations.

For regions sharing overlap with a driver-location, or other reasons where detection may be used to facilitate safety-related functionality, the process can err on the side of guessing incorrectly (i.e., assuming the device is in the least-safe seating zone) until such time as sufficient data is gathered to indicate otherwise. For example, a device may be detected on the rearward edge of a driver-zone when detection is first attempted. If this device were on the wrist of someone tapping a driver on the shoulder, later sampling would reveal the device being typically located in the zone behind the driver, which would be excessively uncommon in occurrence, over the course of a drive, if the device were actually worn by the driver. In instances such as this a long sampling period or intermittent sampling will quickly reveal the actual location of the device, and those cases would only be incorrect if the driver were inexplicably keeping (or intentionally keeping) the wearable device in a non-driver zone.

A fading filter can help remove residual signals that are bouncing around the interior from previous transmissions, and the analyzer can use the resulting measured signals to produce a time and magnitude matrix. The values of this matrix can be compared to known data about relative voxel expectations to determine which voxel probably contains the wearable device.

FIG. 7 illustrates a non-limiting example of a vehicle space divided into a voxel coordinate system. As can be seen in this illustrative example, the top-down view 701 shows 12 locations 705 corresponding to five possible seating locations. The driver side location is the largest, to err on the side of over inclusion for edge cases (driver right wrist vs. passenger left wrist). Any reasonable configuration or degree of granularity could be used, with the understanding that determining a specific voxel may become more difficult the higher the granularity, which is a tradeoff for the likelihood of less precision about approximate location, with lower granularity.

The side-view shows the voxels in a four-high array 703. For any given signal, the arrival of the first signal may be set as time=0 and magnitude=1, and then the relative arrival times of later signals and relative magnitudes of later signals may be determined off of this baseline. Actual arrival times and magnitudes may also be observed, and may be useful, for example, in a first-pass filter. The higher the granularity, the more useful the first-pass filter may be, since in a highly granular system there may be numerous voxels sharing general first arrival and magnitude value characteristics. Filtering out impossible voxels and/or including only-likely voxels can reduce the considered voxel set using a first-pass filter based on actual values observed (time and magnitude), which could be useful in a highly granular system, for example, to reduce the considered data set.

Based on observed actual and/or relative signal arrival times and magnitudes, the analyzation process can determine a rough approximation of which voxel contains the wearable. There may be a likelihood associated with a plurality of voxels, representing the expectation that the wearable is located within a given voxel. That is, some data may indicate a first or second voxel, while other data may indicate a second or third voxel. Depending on the volume of data, various likelihood values may be assigned to each voxel. The exact voxel may not matter, if, for example, all the identified voxels correspond to the same expected seating location.

In one example, the wearable location is used to determine the location of a mobile device (e.g., phone, tablet, etc.) associated with the wearable. Or, alternatively, the wearable location is used to determine the location of a person associated with both the wearable and the device. The gateway or other analyzation/control process may provide or control mobile device functionality based on the location of the user. Rear seat passengers may be given device-based control of rear seat functions (infotainment, HVAC, etc) and front seat passengers may be given a wider set of controls (navigation, infotainment, HVAC, vehicle radio, etc). Driver mobile device controls may be severely limited and or disabled entirely. Control over device functions may extend to native device functions as well, such as texting, calling and emailing, as opposed to simply allowing or preventing control over vehicle functions. This can tie native device functionality to a possessor's location within a vehicle.

In instances where device control is dictated based on a driver/passenger determination or a front-seat/rear-seat determination, the exact voxel of a wearable may not matter in many cases. If voxels 1, 2 and 3 are all designated as corresponding to a passenger seat (in the first instance) or a rear or front seat (in the second instance), it does not matter which voxel actually contains the device. If at least one of the voxels is designated as corresponding to a different location than the other voxels, a determination as to which voxel to use as the basis for a control can be made. In one example, this determination may relate to the nature of the control. That is, if the control relates to a vehicle infotainment or HVAC feature, the process may elect to designate the wearable as being located in the highest likely voxel. Even if this results in an erroneous seating determination, the net impact will be minimal. Later sampling may reveal a change, or the identified occupant may be given a slightly altered set of vehicle controls.

On the other hand, in a situation where there is some question of controlling a device for safety reasons, the process may elect to designate the seating location as the most risky location if any of the voxels corresponds to a known risky location. For example, if the likelihood is voxel 1=10%, voxel 2=70% and voxel 3=20%, but voxel 1 is a driver seat voxel, the process may determine that the wearable (and thus the occupant and mobile device) is located in the driver seat, since there is at least some chance that this is true. Later sampling may reveal this to be incorrect, and a change to the identified passenger and device locations can be made, but the process can err on the side of over inclusion for certain control aspects when the determination is made for safety-related reasons In the same preceding example, the process may decide that the device(s) (the wearable and mobile) are likely located in a front passenger seat, if voxels 2 and 3 are correlated to the front passenger seat and voxel 1 is correlated to a rear passenger seat. Other vehicle data may also be used to make the case for a particular location of the wearable. For example, if it is difficult to determine if the wearable is in the passenger side front seat or rear seat, the occupant classification system might determine that the front seat is occupied by the weight of the passenger and the rear seat is unoccupied.

Figure 8:
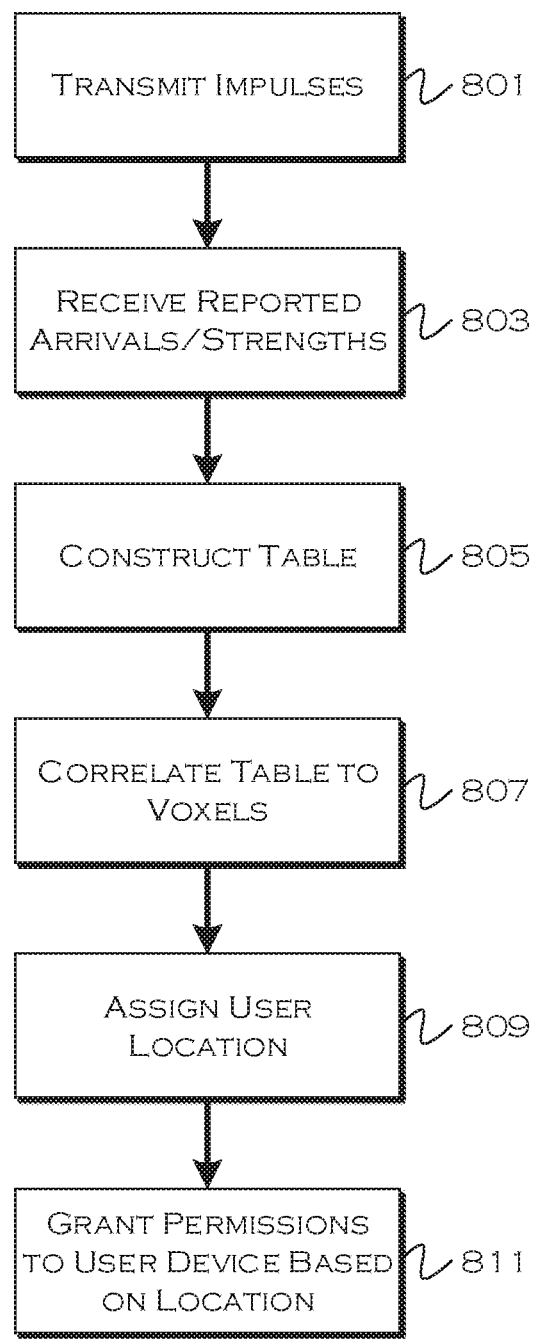
FIG. 8 illustrates a non-limiting process for user device location determination and functionality control.

FIG. 8 illustrates a non-limiting process for user device location determination and functionality control. In this example, the process executes on the vehicle gateway, controlling a transceiver for polling purposes, and later controlling one or more occupant mobile device functions based on results of polling.

The process transmits a series of impulses at known intervals 801. The arrival times and magnitudes of the received impulses, as received and measured by a wearable device worn by an occupant, determine the approximate location of the wearable device. The impulse transmission (polling) can be done for a fixed period of time and/or over periodic intervals. Polling over intervals (at different points in a journey) may provide additional data that can be used to correct initial observations that were erroneous.

In this example, the wearable device receives the impulses (directly and reflected/impeded off-of/by a variety of inter-vehicular surfaces). The wearable device in this example may report the detected values and magnitudes to the gateway or another process, although it is also possible for a process on the wearable device to perform an analysis if there will not be undue strain on the wearable device processor/battery.

The process receives the reported arrival times and signal strengths 803 from the wearable device, and constructs a matrix, table or other form of the data usable for analysis 805. The process then compares this tabulated data to data indicating which voxels are likely to contain the wearable 807. Each voxel may have certain data-characteristics associated therewith. For example, certain voxels may have a minimum or maximum signal arrival time, indicating when a particular signal (e.g., the initial signal) should have arrived. Other characteristics can include the duration between two signals, the magnitude change between two signals, etc. Since more than one data pulse is used in this example, variations in the gathered data can help narrow down the determination as to which voxel(s) apply. Likelihood can be based on what percentage of voxel-characteristics appear to be met by the observations, as well as weighting of those characteristics if some are observed to be more highly indicative than others. Other suitable procedures for ordering a likelihood of voxel locations can also be used.

The process then assigns a likely location to a user 809 (associated with the wearable device in a user profile or other pre-identified manner, for example). As previously noted, the choice of user location, if more than one location is available based on possible wearable device voxel locations, may depend on the particular control enacted and/or the purpose of the control. Users may even be assigned two locations for differing control purposes, until sufficient sampling data narrows the location down to a single location.

Since the user is associated with both a wearable and a mobile device, and/or the wearable and mobile device are associated with each other, the user location/wearable location is considered to represent the mobile device location. Accordingly, the process can then provide, add, disable, etc. mobile device functionality based on what functionality is appropriate for a given seating location 811. The determinations as to associations can be pre-established and stored in a gateway-accessible data file, and the determination as to what functionality is appropriate may be established by a manufacturer, by law and/or by user configuration.

So, for example, some states may mandate no texting by a driver, and thus may mandate that texting be disabled for driver mobile devices in the preceding scenarios where a corresponding wearable device is detected in a driver location. In states where such a control is not mandatory, a parent may disable the texting or other functions for a teen mobile device when a teen wearable is detected in a driver location.

The choice whether to enable or disable functions may be based on the purpose of the functions or design choices. If a parent is disabling functions of a teen device for safety purposes, the vehicle may choose to enable functions if the teen is identified as being located outside the driver seat. This prevents the teen from simply not wearing the wearable to avoid vehicle control (this also assumes the vehicle can connect to or otherwise affect control of the mobile device). In one example, an application residing on the mobile device may require some form of detection or communication if the mobile device is under speed, in order for certain device functionality to be enabled. That is, a parent could configure the mobile device such that the device requires affirmative vehicular confirmation (or internal confirmation, if the mobile device does the seating analysis) that user wearable was detected in a location that indicates the user is not a driver, before allowing access to certain functions. This is an alternative to simply disabling functions when the device-possessor is a driver, which is the alternative option.

Since a wearable device is less likely to be set aside or removed, detection of the wearable device (and its location) is a reasonable proxy for the location of an occupant. Since the appropriateness of access to many device functions can be correlated to a seating location, vehicular control over device-functionality access can be enacted based on a person's seating location. Associations between the person, the wearable device and the mobile device help tie the data together in a meaningful fashion.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined in logical manners to produce situationally suitable variations of embodiments described herein.

What is claimed is:

1. A system comprising:
a processor configured to: transmit a series of impulses into a vehicle interior; receive data from a wearable-device receiver receiving the impulses, the data indicating arrival times and magnitudes of the impulses;
analyze the arrival times and magnitudes to determine a likely wearable device location; and
control a functionality aspect of a mobile device associated with the wearable device, based on the likely wearable device location;
wherein the processor is configured to determine one or more voxels in which the wearable device is likely located, the voxels having predefined associations to seating locations within the vehicle, and the determination based on a look-up of predefined expected signal values in a table predetermined for a vehicle model.

2. The system of claim 1, wherein the data indicates a plurality of arrival times and magnitudes of received impulses for each impulse of the series of impulses.

3. The system of claim 2, wherein the processor is configured to analyze one of the plurality of arrival times and magnitudes relative to other of the plurality of arrival times and magnitudes.

4. The system of claim 3, wherein the processor is configured to treat a first of the plurality of arrival times as a starting time and a first of the plurality of magnitudes as a full magnitude for purposes of relative comparison to others of the plurality of arrival times and magnitudes.

5. The system of claim 1, wherein the processor is configured to determine likely seating location for a pre-identified wearable device possessor, based on the one or more voxels.

6. The system of claim 5, wherein the processor is configured to determine the likely seating location based on a voxel or plurality of the one or more voxels having a highest aggregate likelihood of containing the wearable device.

7. The system of claim 5, wherein the processor is configured to determine the likely seating location based on a voxel having any likelihood of containing the wearable device, when a mobile device function is controlled for a pre-designated safety reason.

8. The system of claim 1, wherein the mobile device is associated with the wearable device based on a predefined association between the mobile device and a user and the wearable device and the same user.

9. The system of claim 1, wherein the mobile device includes a cellular phone.

10. The system of claim 9, wherein the wearable device includes a smart watch.

11. The system of claim 1, wherein the functionality aspect includes enablement of a function native to the mobile device.

12. The system of claim 1, wherein the functionality aspect includes disablement of a function native to the mobile device.

13. The system of claim 1, wherein the functionality aspect includes access to control over a vehicle system.

14. The system of claim 13, wherein the vehicle system includes a predefined relationship to a seating location associated with the wearable device location.

15. A computer-implemented method comprising: controlling functionality of a cellular phone based on user-location identification resulting from analysis of observed relative timing and strength values of signals received by a wearable device, the wearable device having a predefined association to the cellular phone, the signals including a plurality of received signals for each of a series of impulses transmitted by a vehicle transceiver included in a vehicle also containing both the wearable device and cellular phone;
wherein the method further includes: determining a location of the wearable device base on the analysis, including obtaining a likely device location via a lookup, based on observed signal values, in a table designated as corresponding to a vehicle model; determining a location of the cellular phone based on the location of the wearable device; and controlling functionality based on the determined location of the cellular phone.

16. The method of claim 15, wherein the controlling the functionality includes controlling the functionality of a native mobile device feature.

17. The method of claim 15, wherein the controlling the functionality includes providing access to a vehicular control feature.

18. A non-transitory storage medium, storing instructions that, when executed by a processor, cause the processor to perform a method comprising: transmitting a series of impulses from a vehicle transceiver; analyzing arrival data, including relative strength and timing, of a plurality of received signals for each of the series of impulses, received by and reported from a wearable device, to determine a wearable device location; determining a user location based on the wearable device location, the user having a predefined association with the wearable device; and controlling mobile device functionality, the mobile device having a predefined association with the wearable device or user, the control based on mobile device location;
determining a location of the wearable device base on the analysis, including obtaining a likely device location via a lookup, based on observed signal values, in a table designated as corresponding to a vehicle model; determining a location of the cellular phone based on the location of the wearable device; and controlling functionality based on the determined location of the cellular phone.

* * * * *